United States Patent
Cai et al.

(10) Patent No.: US 12,401,488 B1
(45) Date of Patent: Aug. 26, 2025

(54) DYNAMIC TIMING LOOP GAIN TO COMPENSATE PHASE INTERPOLATION NONLINEARITIES

(71) Applicant: Credo Technology Group Limited, George Town (KY)

(72) Inventors: Fang Cai, San Carlos, CA (US); Xin Chang, San Jose, CA (US); Junqing Sun, Fremont, CA (US); Haoli Qian, Fremont, CA (US)

(73) Assignee: Credo Technology Group Limited, Grand Cayman (KY)

( * ) Notice: Subject to any disclaimer, the term of this patent is extended or adjusted under 35 U.S.C. 154(b) by 0 days.

(21) Appl. No.: 18/641,575

(22) Filed: Apr. 22, 2024

Related U.S. Application Data

(60) Provisional application No. 63/571,341, filed on Mar. 28, 2024.

(51) Int. Cl.
*H04L 7/00* (2006.01)
*H04L 7/033* (2006.01)

(52) U.S. Cl.
CPC .......... *H04L 7/0025* (2013.01); *H04L 7/0331* (2013.01)

(58) Field of Classification Search
CPC ................ H04L 7/0025; H04L 7/0331
See application file for complete search history.

(56) References Cited

U.S. PATENT DOCUMENTS

| | | | |
|---|---|---|---|
| 4,686,488 A | 8/1987 | Attenborough | |
| 6,055,284 A * | 4/2000 | Kweon | H04L 7/0029 |
| | | | 375/350 |
| 7,058,150 B2 | 6/2006 | Buchwald et al. | |
| 9,800,438 B1 * | 10/2017 | Zhang | H04L 25/03885 |
| 9,935,800 B1 | 4/2018 | He | |
| 10,313,105 B2 | 6/2019 | Gao et al. | |
| 10,892,763 B1 | 1/2021 | Hidaka et al. | |
| 11,552,643 B1 * | 1/2023 | Tachibana | H04L 7/0062 |
| 2005/0286669 A1 * | 12/2005 | Buchwald | H04L 25/20 |
| | | | 375/356 |

(Continued)

OTHER PUBLICATIONS

Machine translation of JP-H11243432-A (Year: 1999).*

(Continued)

*Primary Examiner* — Jean B Corrielus
(74) *Attorney, Agent, or Firm* — Ramey LLP; Daniel J. Krueger

(57) ABSTRACT

Integrated circuit transceivers having digital timing recovery loops with phase interpolation may incorporate dynamic loop gains to compensate for nonlinearities of the phase interpolation. An illustrative receiver circuit includes: a phase interpolator, a sampling element, a timing error estimator, and a feedback circuit. The phase interpolator provides a sampling signal by applying a phase shift to a clock signal in response to a phase control signal. The sampling element produces a digital receive signal by sampling an analog receive signal in accordance with the sampling signal. The timing error estimator produces a timing error signal indicating an estimated timing error of the sampling signal relative to the analog receive signal. The feedback circuit derives the phase control signal from the timing error signal using a scaling element configured to scale the estimated timing error by a scale factor that depends on the phase control signal.

20 Claims, 5 Drawing Sheets

(56) References Cited

U.S. PATENT DOCUMENTS

2015/0139375 A1* 5/2015 Doi .................. H04L 25/14
                                                    375/356
2017/0012630 A1* 1/2017 Kou ................ H03M 1/0624
2019/0198602 A1* 6/2019 Liu .................... H10D 1/20

OTHER PUBLICATIONS

Ching-Yuan Yang, A high-frequency CMOS multi-modulus divider for PLL frequency synthesizers, Springer Science, Mar. 15, 2008, pp. 155-162.

Jan W.M. Bergmans, Digital Baseband Transmission And Recording, Kluwer Academic Publishers, 1996, pp. 590-614, Eindhoven, The Netherlands.

Kurt H. Mueller, Markus Muller, Timing Recovery in Digital Synchronous Data Receivers, IEEE Transactions on Communications, May 5, 1976, pp. 516-531, vol. 24.

Faisal A. Musa, High-Speed Baud-Rate Clock Recovery, Graduate Department of Electrical and Computer Engineering University of Toronto, 2008, pp. 1-120, Toronto, Canada.

* cited by examiner

FIG. 1
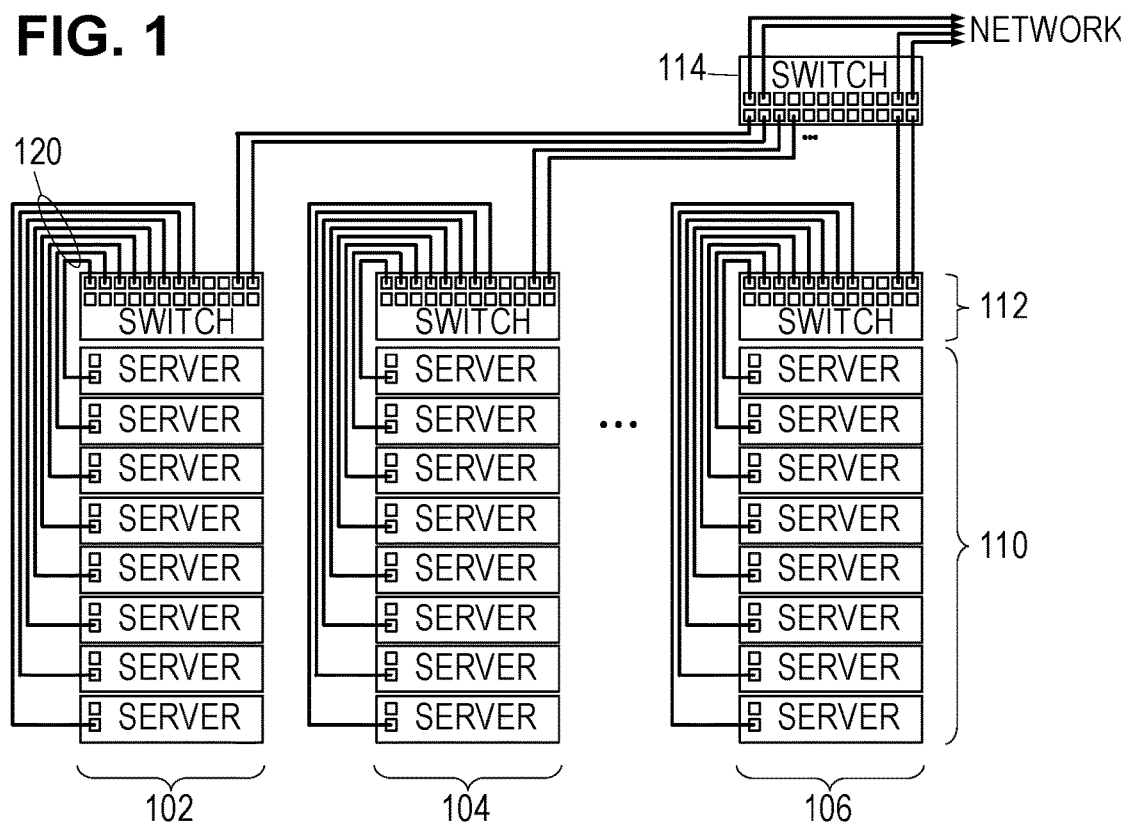
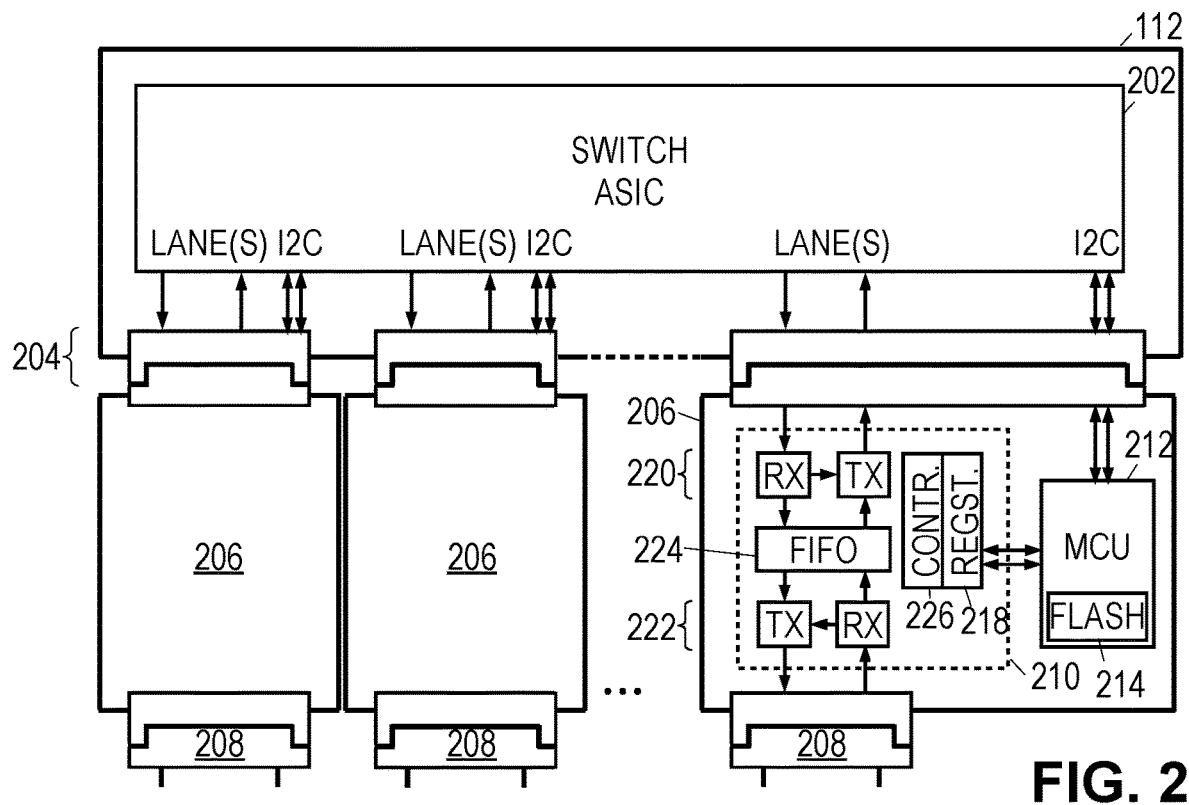
FIG. 2

DYNAMIC TIMING LOOP GAIN TO COMPENSATE PHASE INTERPOLATION NONLINEARITIES

BACKGROUND

Digital communications occur between sending and receiving devices over an intermediate communications medium, e.g., a fiberoptic cable or insulated copper wire, having one or more designated communications channels, e.g., carrier wavelengths or frequency bands. Each sending device typically transmits symbols at a fixed symbol rate, while each receiving device detects a potentially corrupted sequence of symbols and attempts to reconstruct the transmitted data.

A "symbol" is a state or significant condition of the channel that persists for a fixed period, called a "symbol interval." A symbol may be, for example, an electrical voltage or current level, an optical power level, a phase value, or a particular frequency or wavelength. A change from one channel state to another is called a symbol transition. Each symbol may represent (i.e., encode) one or more binary bits of the data. Alternatively, the data may be represented by symbol transitions, or by sequences of two or more symbols. The simplest digital communication links use only one bit per symbol; a binary '0' is represented by one symbol (e.g., an electrical voltage or current signal within a first range), and binary '1' by another symbol (e.g., an electrical voltage or current signal within a second range).

Channel non-idealities produce dispersion which may cause each symbol to perturb its neighboring symbols, causing intersymbol interference (ISI). As the symbol rate increases, ISI can make it difficult for the receiving device to determine which symbols were sent in each interval, particularly when such ISI is combined with additive noise.

The open literature discloses many equalization and demodulation techniques for recovering digital data from the degraded receive signal even in the presence of ISI. A critical piece of such techniques is a determination of the correct sample timing, as sample timing directly affects the signal to noise ratio of the discrete samples. Many strategies for detecting and tracking optimal sample times exist with varying degrees of tradeoff between simplicity and performance. Notable examples can be found in, e.g., U.S. Pat. No. 7,058,150 "High-Speed Serial Data Transceiver and Related Methods"; and U.S. Pat. No. 10,892,763 "Second-order Clock Recovery Using Three Feedback Paths", both of which are incorporated herein by reference. These examples are particularly notable due to their use of sampling clock phase interpolators.

Nonlinearity is a potential issue with the use of phase interpolators, and it is one that becomes more challenging at higher clock rates. The authors have discovered that such nonlinearities may lead to oscillations and instability in the clock recovery circuit with commensurate degradation of receiver performance.

SUMMARY

Accordingly, there are disclosed herein integrated circuit transceivers and receivers and methods having digital timing recovery loops with phase interpolation and dynamic loop gains to compensate for nonlinearities of the phase interpolation. One illustrative integrated receiver circuit includes: a phase interpolator, a sampling element, a timing error estimator, and a feedback circuit. The phase interpolator is configured to provide a sampling signal by applying a phase shift to a clock signal in response to a phase control signal. The sampling element is configured to produce a digital receive signal by sampling an analog receive signal in accordance with the sampling signal. The timing error estimator is configured to produce a timing error signal indicating an estimated timing error of the sampling signal relative to the analog receive signal. The feedback circuit is configured to derive the phase control signal from the timing error signal, the feedback circuit including a scaling element configured to scale the estimated timing error by a scale factor that depends on the phase control signal.

An illustrative clock recovery method includes: providing a phase control signal to a phase interpolator to derive a sampling signal from a clock signal; sampling an analog receive signal in accordance with the sampling signal to obtain a digital receive signal; producing a timing error signal indicating an estimated timing error of the sampling signal relative to the analog receive signal; and deriving the phase control signal from the estimated timing error, said deriving including scaling the estimated timing error by a scale factor that depends on the phase control signal.

The foregoing circuit and may be embodied as a semiconductor IP core residing on a nontransient information storage media. The core may represent circuit schematics using, e.g., a hardware description language, or may represent semiconductor manufacturing process mask patterns using, e.g., GDSII or OASIS language.

Each of the foregoing may be implemented individually or in combination and may be implemented with any one or more of the following features in any suitable combination: 1. a demodulator that extracts a transmitted symbol stream from the digital receive signal. 2. a histogram circuit configured to determine a relative probability of each phase control signal value. 3. an inversion element configured to determine the scale factor using a reciprocal of said relative probability. 4. the scale factor is stored in a lookup table that is configured to receive the phase control signal. 5. the scale factor is derived from contents of a lookup table that is configured to receive the phase control signal. 6. the scaling element is part of a first feedback path in the feedback circuit configured to minimize a phase component of the estimated timing error. 7. the feedback circuit includes a second feedback path configured to minimize a frequency component of the estimated timing error. 8. a fractional-N phase lock loop configured to generate the clock signal. 9. the scaling element is part of a first feedback path in the feedback circuit configured to minimize a phase component of the estimated timing error. 10. the feedback circuit includes an additional feedback path configured to derive a division-ratio error from the estimated timing error.

BRIEF DESCRIPTION OF THE DRAWINGS

FIG. 1 shows an illustrative network.

FIG. 2 is a block diagram of an illustrative switch.

DETAILED DESCRIPTION

Figure 3:
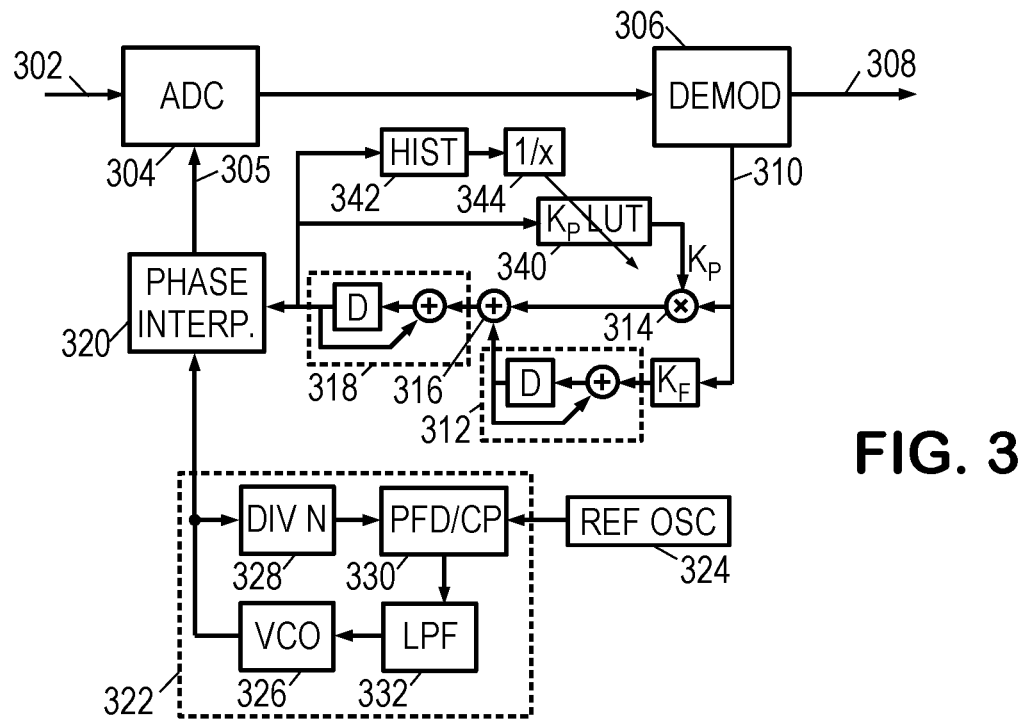
FIGS. 3-6 show illustrative digital communications receivers with varying clock recovery circuit configurations.

While specific embodiments are given in the drawings and the following description, keep in mind that they do not limit the disclosure. On the contrary, they provide the foundation for one of ordinary skill to discern the alternative forms, equivalents, and modifications that are encompassed in the scope of the appended claims.

For context, FIG. 1 shows an illustrative network such as might be found in a data processing center, with multiple server racks 102-106 each containing multiple servers 110 and at least one "top of rack" (TOR) switch 112. The TOR switches 112 are connected to aggregator switches 114 for interconnectivity and connection to the regional network and internet. (As used herein, the term "switch" includes not just traditional network switches, but also routers, network bridges, hubs, and other devices that forward network communication packets between ports.) Each of the servers 110 is connected to the TOR switches 112 by network cables 120, which may convey signals at high symbol rates.

FIG. 2 shows an illustrative switch 112 with an application-specific integrated circuit (ASIC) 202 that implements packet-switching functionality coupled to port connectors 204 for line cards or "pluggable modules" 206. Pluggable modules 206 couple between the port connectors 204 and cable connectors 208 to improve communications performance by way of equalization and optional format conversion (e.g., converting between electrical and optical signals). The pluggable modules 206 may comply with any one of various pluggable module standards including SFP, SFP-DD, QSFP, QSFP-DD, and OSFP. Alternatively, the cables themselves may have connectors that conform to the pluggable module standards and incorporate the pluggable module circuitry.

The pluggable modules 206 may each include a retimer chip 210 and a microcontroller chip 212 that controls operation of the retimer chip 210 in accordance with firmware and parameters that may be stored in nonvolatile memory 214. The operating mode and parameters of the pluggable retimer modules 206 may be set via a two-wire bus such as 12C or MDIO that connects the microcontroller chip 212 to the host device (e.g., switch 112). The microcontroller chip 212 responds to queries and commands received via the two-wire bus, and responsively retrieves information from and saves information to control registers 218 of the retimer chip 210.

Retimer chip 210 includes a host-side transceiver 220 coupled to a line-side transceiver 222 by first-in first-out (FIFO) buffers 224. Though only a single lane is shown in the figure, the transceivers may support multiple lanes conveyed via multiple corresponding optical fibers or electrical conductors. A controller 226 coordinates the operation of the transceivers in accordance with the control register contents and may provide for multiple communication phases pursuant to a communications standard such as the Fibre Channel Standard published by the American National Standard for Information Technology Accredited Standards Committee INCITS, which provides phases for link speed negotiation (LSN), equalizer training, and normal operation.

The receiver portion of each transceiver may employ any of the many equalization and demodulation techniques disclosed in the open literature for recovering digital data from the degraded receive signal even in the presence of ISI. As previously mentioned, a critical piece of such techniques is a determination of the correct sample timing, as sample timing directly affects the signal to noise ratio of the discrete samples.

FIGS. 3-6 show various clock recovery methods that may be implemented by an illustrative integrated receiver circuit. The illustrated receivers each employ a phase interpolator as part of the clock recovery circuit, and further employ a dynamic gain in the digital timing loop to compensate for potential nonlinearities of the phase interpolator.

The receiver of FIG. 3 includes an analog-to-digital converter 304 or other sampling element that samples an analog receive signal 302 at sample times corresponding to transitions in a sampling signal 305, thereby providing a digital receive signal to a demodulator 306. The demodulator 306 may apply equalization as well as symbol detection using, e.g., a matched filter, a decision feedback equalizer, a maximum likelihood sequence estimator, or any other suitable techniques for extracting the digital symbol stream conveyed by the analog receive signal. The resulting stream of detected symbols 308 may be provided as a parallelized symbol stream for handling by "on-chip" circuitry, e.g., FIFO buffering, error correction, and retransmission.

The demodulator 306 includes a timing error estimator of some form to generate an estimated timing error signal 310. Any suitable design may be used for the timing error estimator including, e.g., a bang-bang or proportional phase detector. One suitable timing error estimator is set forth in co-owned U.S. Pat. No. 10,447,509, "Precompensator-based quantization for clock recovery", which is hereby incorporated herein by reference in its entirety. Other suitable timing error estimators can be found in the open literature, including, e.g., Mueller, "Timing Recovery in Digital Synchronous Data Receivers", IEEE Trans. Commun., v24n5, May 1976, and Musa, "High-speed Baud-Rate Clock Recovery", U. Toronto Thesis, 2008.

In FIG. 3, a feedback circuit derives a phase control signal from the timing error signal 310 to control a phase interpolator 320 in a fashion that statistically minimizes the timing error signal 310. A frequency error accumulator 312 integrates the timing error signal after it has been scaled by a frequency coefficient ($K_F$), thereby obtaining a frequency offset signal. A multiplier or other scaling element 314 scales the phase error with a dynamic phase coefficient ($K_P$). A summer 316 adds the scaled phase error to the frequency offset signal. A filter 318 operates on the output of summer 316 to obtain the control signal for phase interpolator 320. In FIG. 3, the filter 318 is shown as an accumulator, but other filter implementations would also be suitable.

The phase interpolator 320 also receives a clock signal from a phase lock loop (PLL) 322. The phase control signal causes the phase interpolator 320 to produce the sampling signal by adjusting the phase of the clock signal in a fashion that minimizes an expected value of the timing error signal. In other words, the control signal compensates for both the frequency offset component and phase component of the estimated timing error of the clock signal relative to the analog receive signal 302, thereby phase-aligning the sampling signal 305 with the data symbols in the analog receive signal 302. Various suitable phase interpolator implementations can be found in the open literature. See, e.g., U.S. Pat. No. 7,058,150 "High-speed serial data transceiver and related methods" to Buchwald et al.

The clock signal produced by PLL 322 is a frequency-multiplied version of a reference clock signal from reference oscillator 324. A voltage-controlled oscillator (VCO) 326 supplies the clock signal to both the phase interpolator 320 and to a counter 328 that divides the frequency of the clock signal by a constant modulus N. The counter supplies the divided-frequency clock signal to a phase-frequency detector (PFD) 330. PFD 330 may use a charge pump (CP) as part of determining which input (i.e., the divided-frequency clock signal or the reference clock signal) has transitions earlier or more often than the other. A low pass filter 332 filters the output of PFD 330 to provide a control voltage to VCO 326. The filter coefficients are chosen so that the divided frequency clock becomes phase aligned with the reference oscillator.

Note that for at least some contemplated uses, the reference clock used by the receiver will often drift relative to the reference clock used by the transmitter and may differ by hundreds of ppm. In the embodiment of FIG. 3, the resulting frequency offset between the PLL's clock signal output and the analog data signal may need to be corrected by continuous phase rotation by the phase interpolator 320. This mode of operation imposes stringent demands on the linearity of the phase interpolator 320 over its entire tuning range, as the interpolator will repeatedly cycle through each of the phase interpolations during the continuous rotation.

The presence of phase interpolation nonlinearities may be visualized as a dependence of the feedback loop gain on the current phase interpolation setting for the phase interpolator, causing the clock recovery circuit to be more or less sensitive to timing error depending on the control signal value. In the presence of continuous phase rotation, this sensitivity can be observed as a variation in probability for each phase interpolation setting. (The continuous phase rotation may be induced, e.g., by adding a small offset bias to the phase error signal 310, adjusting the frequency offset stored by the frequency accumulator 312, causing summer 316 to introduce an additional offset, or adjusting the PLL to introduce an actual frequency offset.) Those phase interpolation settings having a reduced sensitivity to phase error will demonstrate a higher probability relative to those phase interpolation settings having an enhanced sensitivity and thus having an accelerated response to small phase errors. Once the relative probability of each phase control signal value has been determined, the feedback loop gain can be dynamically adjusted to compensate for the phase interpolator nonlinearities. In FIG. 3, the dynamic adjustment is provided by a lookup table 340, which provides a phase coefficient $K_P$ that depends on the phase interpolator's control signal value.

The receiver in FIG. 3 further includes a histogram circuit 342 to determine the relative probabilities of the phase interpolation settings while continuous phase rotation is being induced. The histogram circuit 342 may intermittently sample values of the control signal over a sufficiently long time window to ensure that the histogram statistics are representative of the relative probabilities. A histogram count is obtained for each possible value of the control signal. An inversion element 344 converts each histogram count into a corresponding phase coefficient $K_P$ or optionally into a normalized scale factor for the phase coefficient $K_P$, storing the result in lookup table 340 in the location associated with that value of the control signal. A firmware-programmed microcontroller may perform the function of the inversion element 344.

Figure 4:
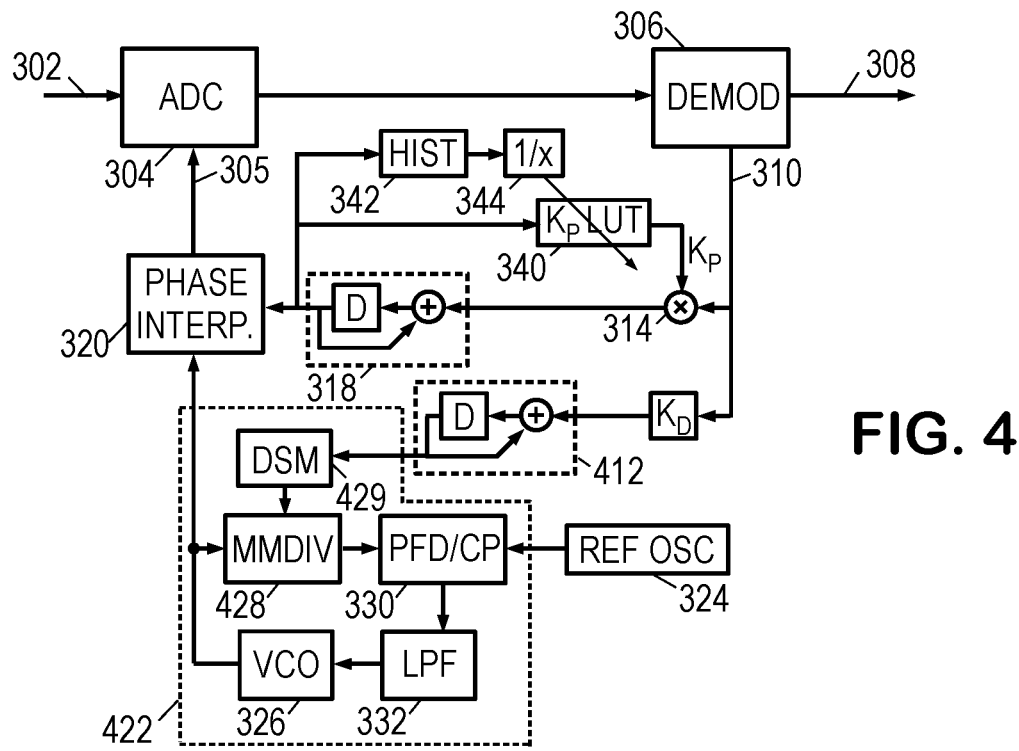

FIG. 4 provides a receive module that embodies an alternative clock recovery circuit configuration. It retains the analog-to-digital converter 304 for sampling the analog receive signal 302 and providing a digital receive signal to the demodulator 306. As before, the demodulator incudes a timing error estimator that generates a timing error signal 310, and a feedback circuit having a feedback path with the dynamic phase coefficient ($K_P$) multiplier 314 and filter 318. However, frequency offset accumulator 312 of the FIG. 3 embodiment is replaced by another feedback path which couples the timing error signal 310 to a fractional-N phase lock loop 422 to correct the frequency offset separately from the phase interpolator 320. This feedback path includes a division-ratio scaling coefficient ($K_D$) and a division-ratio error accumulator 412, which supplies a division-ratio control signal to the fractional-N phase lock loop 422.

The fractional-N phase lock loop 422 is used in place of the original phase lock loop 322 to provide finer-grained frequency control of the clock signal supplied to the phase interpolator 322. The division-ratio control signal adjusts the frequency offset of the clock signal relative to the data in the analog receive signal 302, substantially reducing the phase rotation rate needed from the phase interpolator 320.

A comparison of FIGS. 3 & 4 shows that the phase lock loop 322 and the fractional-N phase lock loop 422 both employ a PFD/CP 330 (comparing a divided frequency clock signal to the reference clock), low pass filter 332 (filtering the error to reduce noise), and a voltage-controlled oscillator 326 (supplying the output clock signal). Rather than dividing the output clock signal with a fixed modulus divider 328, the fractional-N phase lock loop 422 uses a multi-modulus divider 428 that divides by N or N+1, depending on whether the modulus selection signal is asserted at the end of (or, in alternative embodiments, at the beginning of, or at any point during) a count cycle. A delta-sigma modulator (DSM) 429 converts the division-ratio control signal into pulses of the modulus selection signal. The pulse density controls what fractional value between N and N+1 the divider implements, enabling very fine control of the clock frequency supplied to the interpolator 320.

Figure 5:
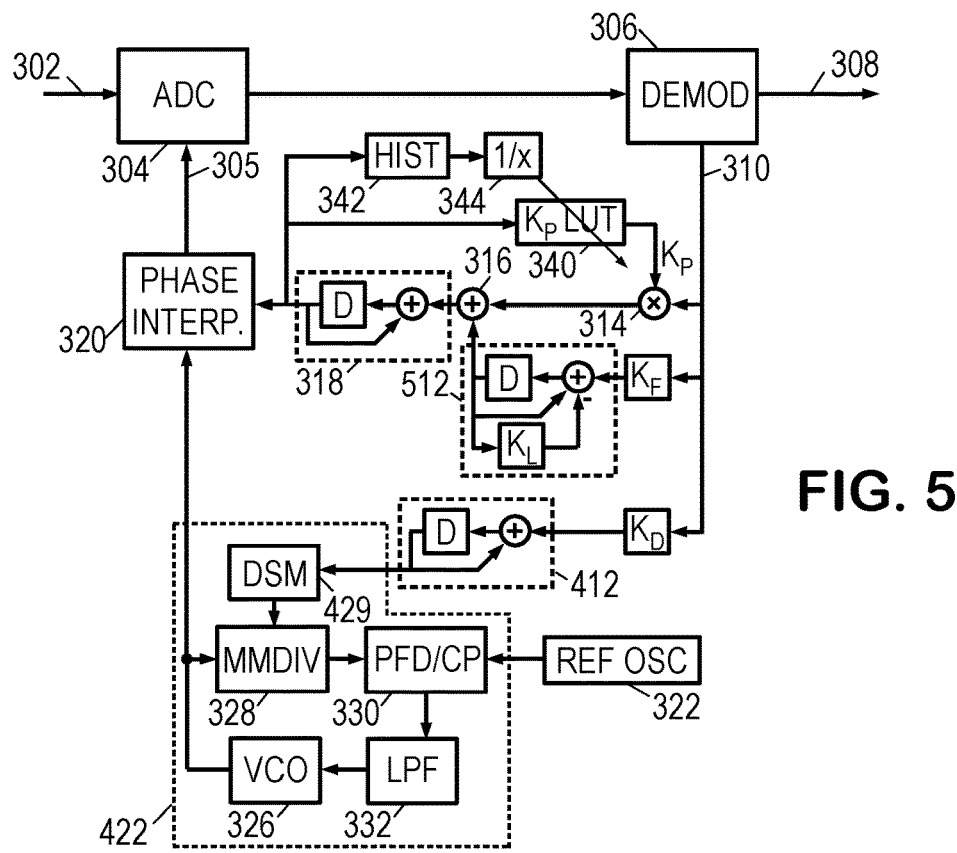

We turn now to FIG. 5, which shows a receiver that includes the feedback paths of the FIG. 3 embodiment, as well as the feedback path of the FIG. 4 embodiment. To ensure that the division-ration error accumulator 412 operates cooperatively with the frequency-offset accumulator 512, the frequency offset error accumulator 312 may be modified to include a leakage coefficient KL. In the modified accumulator 512, the frequency offset signal is multiplied by (1-KL) in each integration cycle. The leakage coefficient (KL) represents a gradual memory loss which, while it enables the feedback circuit to provide a fast response, causes the frequency offset signal to tend toward zero over longer time scales. The division-ratio error accumulator 412, in combination with the low pass filter 332 of the phase lock loop 422, operates on the longer time scale to overcome the memory loss of the modified accumulator 512. Under steady-state or slow-changing conditions, the frequency offset correction is provided by the division-ratio error accumulator 412, reducing the rate of continuous phase rotation the phase interpolator 320 might otherwise need to provide. In conditions where the frequency offset changes more quickly, the more transient corrections are provided by the modified frequency offset accumulator 512.

Figure 6:
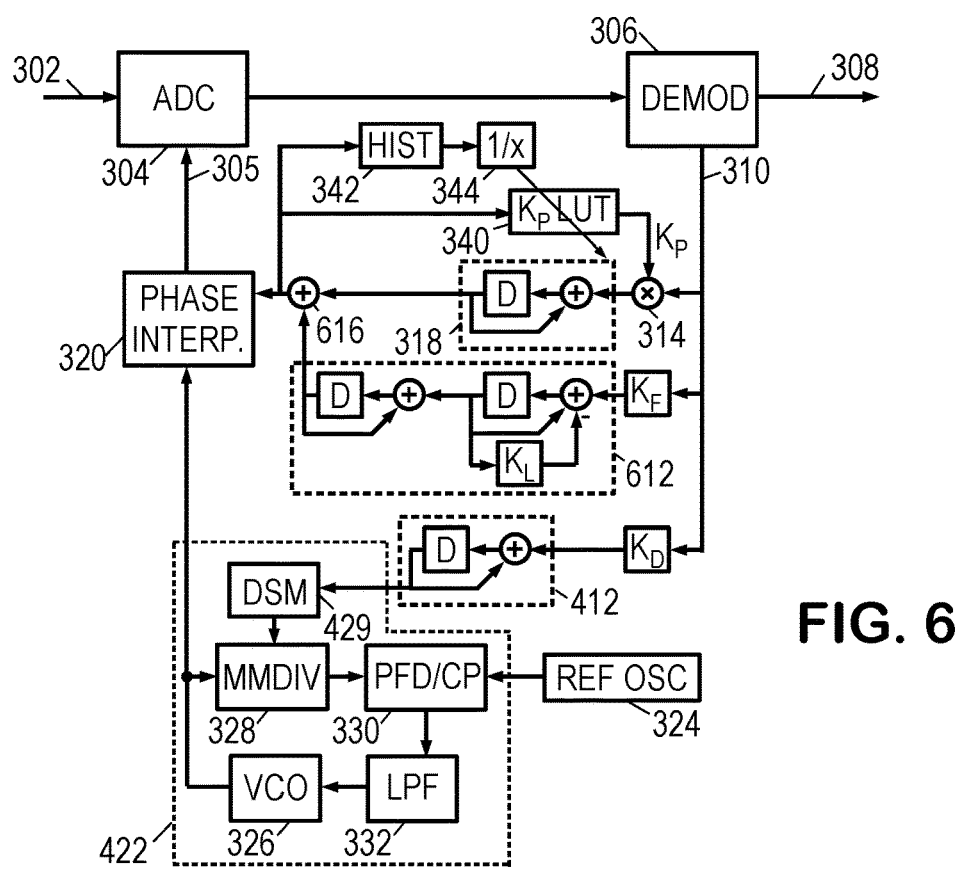

FIG. 6 shows yet another feedback circuit configuration in which the modified frequency offset accumulator 512 is further modified to be a second order filter 612, and a summer 616 combines the output of the second order filter 612 with the output of the phase error filter 318 to form the phase interpolator control signal. The division-ratio error accumulator 412 is unchanged relative to the embodiment of FIG. 5. This implementation may enable the different filters and accumulators to be driven at different clock frequencies, which is potentially advantageous for some applications.

Figure 7:
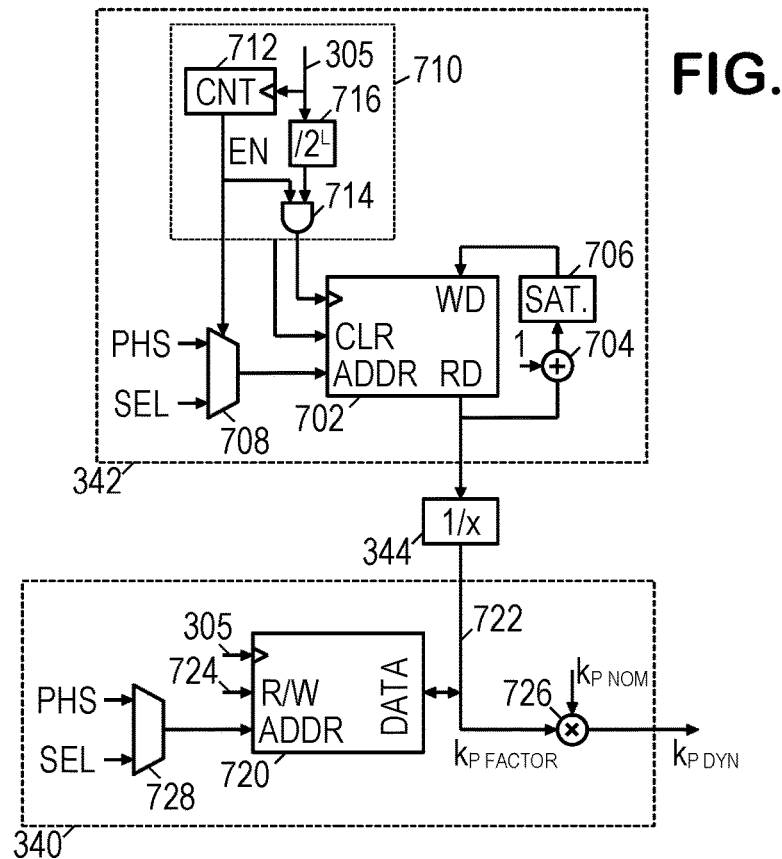
FIG. 7 is a block diagram of an illustrative nonlinearity compensation circuit.

FIG. 7 shows an illustrative implementation of the nonlinearity compensation circuit (elements 340-344) in more detail. In FIG. 7, the histogram circuit 342 includes a memory 702 that may be reset to a cleared state by a CLR signal from controller 710. When an address is supplied to the memory 702, the memory responsively provides read data (RD) representing the contents of the selected address location to a summer 704 that increments the contents by one. A saturation element 706 prevents the contents from rolling over past a maximum value that can be stored by memory 702, e.g., detecting whether the incremented value is all zeros, in which case the saturation element may set the memory location contents to all ones. The memory 702 may be configured to accept the value from the saturation element 706 as write data (WD) for storage in the address location.

A multiplexer 708 supplies the address to the memory 702. When the histogram circuit 342 is collecting statistics, multiplexer 708 is set to provide the phase interpolator phase setting control signal value as the address to memory 702, enabling the memory 702 to increment the contents of the location corresponding to the current value of the control signal. Once the collection window is closed, the multiplexer 708 is set to forward whatever address is supplied by the controller 710, enabling the controller to access the histogram counts for processing and/or storage elsewhere.

Controller 710 may supply a clock signal to the memory 702 during the collection window. The memory clock signal may be derived from the sample clock signal, with a counter 712 asserting an enable signal EN for the length of the collection window, e.g., $2^N$ sample clock signal counts, where N is sufficiently large to provide reliable statistics collection without being so large as to saturate any of the histogram counts. Some implementations may enable adaptation of N, e.g., reducing N if saturation is detected or increasing N if any histogram counts are below a predetermined threshold at the end of the collection window. A gate 714 blocks the memory clock signal when the collection window closes, i.e., when the counter 712 reaches $2^N$. To reduce correlation, a frequency divider 716 may reduce the sample clock frequency by a factor of 2L, so that the phase interpolator control signal value samples are spaced apart, e.g., one out of every $2^L$ symbol intervals.

Once the collection window closes, the controller 710 may systematically retrieve the histogram counts and store the corresponding reciprocal (multiplicative inverse) values provided by inversion element 344 in a lookup table 340. The illustrated lookup table 340 includes a memory 720 that receives an address from multiplexer 728. The multiplexer 728 is initially set to provide address locations selected by the controller 710, which may further supply a read/write signal 724 to store the inverse histogram counts or other multiplicative $K_P$ factors. Once the lookup table 720 has been populated, the multiplexer 728 is set to provide the current value of the phase interpolator's control signal PHS as an address, causing the lookup table to provide the corresponding $K_P$ factor. A multiplier 726 may determine the product of the selected $K_P$ factor with a nominal $K_P$ coefficient value, the product serving as a dynamic phase coefficient $K_{P\_dyn}$.

In a contemplated variation, the memory 702 may be employed both for collection of the histogram counts and as a lookup table during normal operation of the receiver. The incrementing circuitry would be disabled once the histogram count collection process is complete. The controller 710 may store the $K_P$ factors derived from the histogram counts, or alternatively, may employ the inversion element to derive the $K_P$ factor from the histogram counts on an as-needed basis.

Figure 8:
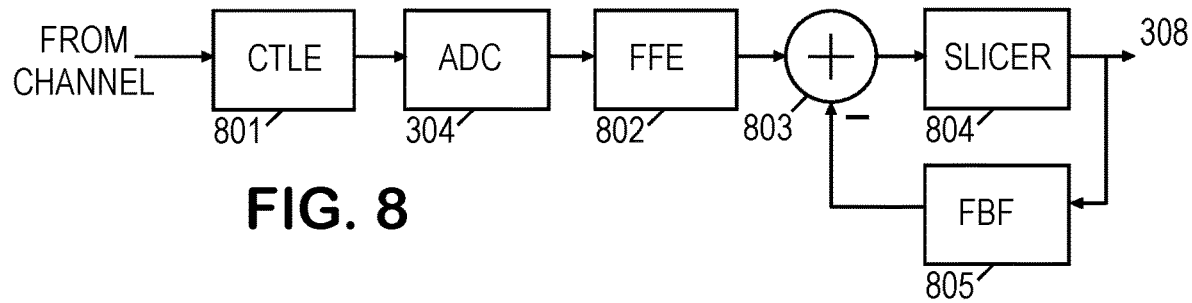
FIG. 8 is a block diagram of an illustrative decision feedback equalizer ("DFE").
Figure 9:
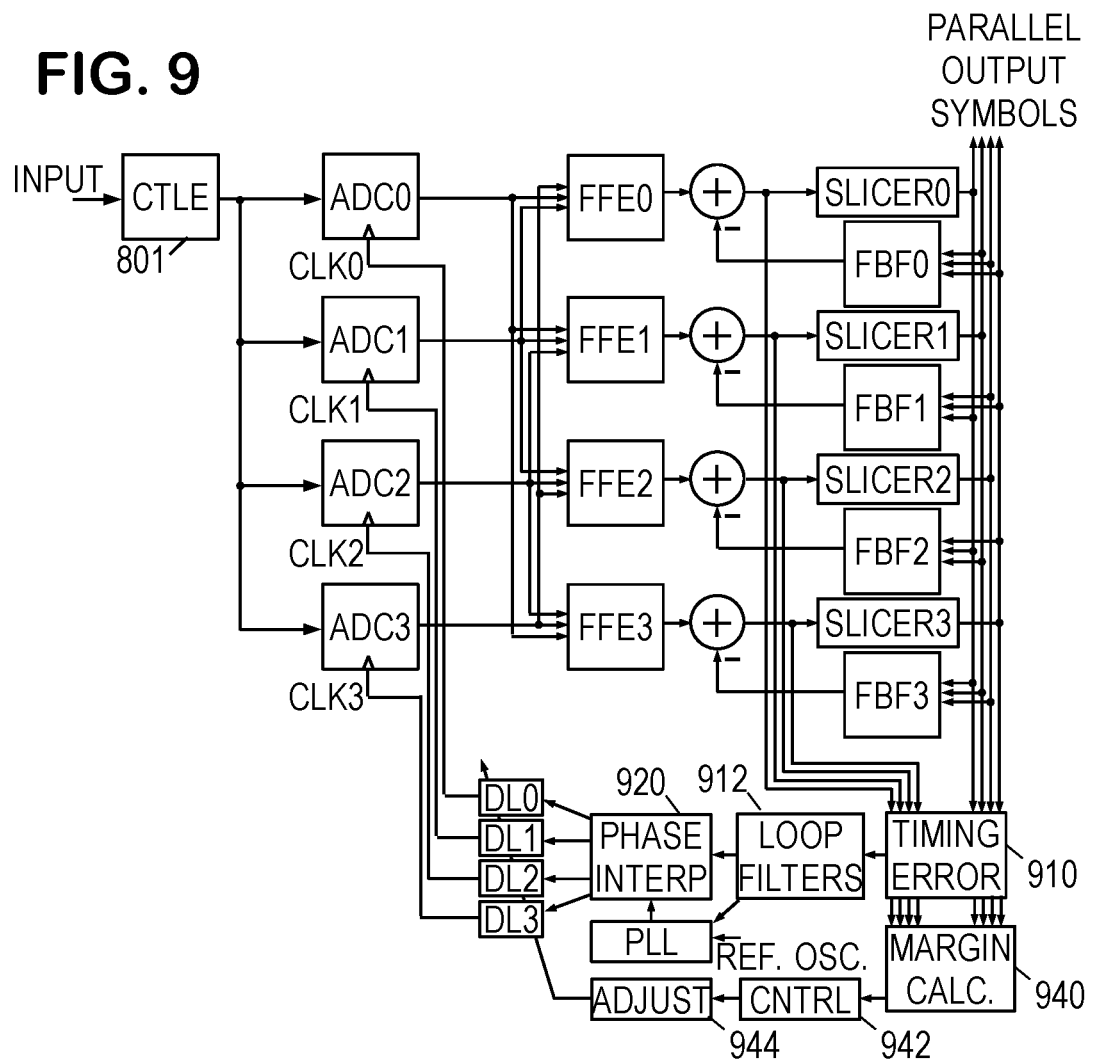
FIG. 9 is a block diagram of an illustrative parallelized DFE.

FIGS. 8 and 9 show illustrative receiver embodiments to provide additional detail for implementation of the demodulator 306, as well as insight into the adaptation of the clock recovery circuitry for parallelization.

FIG. 8 shows an illustrative digital receiver that includes a continuous time linear equalizer ("CTLE") 801 to attenuate out-of-band noise and to optionally provide some spectral shaping to improve a response to high-frequency components of the receive signal. ADC 304 is provided to digitize the receive signal, and a digital filter (also known as a feed-forward equalizer or "FFE") 802 performs further equalization to further shape the overall channel response of the system and minimize the effects of leading ISI on the current symbol. As part of the shaping of the overall channel response, the FFE 802 may also be designed to shorten the channel response of the filtered signal while minimizing any attendant noise enhancement.

A summer 803 subtracts an optional feedback signal from the output of FFE 802 to minimize the effects of trailing ISI on the current symbol, yielding an equalized signal that is coupled to a decision element ("slicer") 804. The decision element 804 includes one or more comparators that compare the equalized signal to corresponding decision thresholds to determine for each symbol interval which constellation symbol the signal's value most closely corresponds to. The equalized signal may also be termed a "combined signal" herein.

The decision element 804 accordingly produces a sequence of symbol decisions (denoted $A_k$, where k is the time index). In certain contemplated embodiments, the signal constellation is a bipolar (non-return-to-zero) constellation representing −1 and +1, necessitating only one comparator using a decision threshold of zero. In certain other contemplated embodiments, the signal constellation is PAM4 (−3, −1, +1, +3), necessitating three comparators employing the respective decision thresholds −2, 0, and +2. (The unit for expressing symbol and threshold values is omitted for generality, but for explanatory purposes may be presumed to be volts. In practice, a scale factor will be employed.)

A feedback filter ("FBF") 805 derives the feedback signal using a series of delay elements (e.g., latches, flip flops, or registers) that store the recent output symbol decisions ($A_{k-1}$, $A_{k-2}$, . . . , $A_{k-N}$, where N is the number of filter coefficients $f_i$). Each stored symbol is multiplied with a corresponding filter coefficient $f_i$, and the products are combined to obtain the feedback signal.

As an aside, we note here that the receiver also includes a filter coefficient adaptation unit, but such considerations are addressed in the literature and are well known to those skilled in the art. Nevertheless, we note here that at least some contemplated embodiments include one or more additional comparators in the decision element 804 to be employed for comparing the combined signal to one or more of the symbol values, thereby providing an error signal that can be used for timing recovery and/or coefficient adaptation.

As the symbol rates increase into the gigahertz range, it becomes increasingly difficult for the ADC 304 and demodulator 306 components to perform their required operations completely within each symbol interval, at which point it becomes advantageous to parallelize their operations. Parallelization generally involves the use of multiple components that share the workload by taking turns, and thereby providing more time for each of the individual components to complete their operations. Such parallel components are driven by a set of staggered clock signals. For example, a four-fold parallelization employs a set of four clock signals, each having a frequency that is one-fourth of the symbol rate so that each symbol interval contains only one upward transition in the set of staggered clock signals. Though a four-fold parallelization is used for discussion purposes here, the actual degree of parallelization can be higher, e.g., 8-, 16-, 32-, or 64-fold. Moreover, the degree of parallelization is not limited to powers-of-two.

FIG. 9 shows an illustrative receiver having a parallelized equalizer implementation (including the optional feedback filters for DFE). As with the implementation of FIG. 8, the CTLE 801 filters the channel signal to provide a receive signal, which is supplied in parallel to an array of analog-to-digital converters (ADC0-ADC3). Each of the ADC elements is provided with a respective one of the staggered clock signals. The clock signals have different phases, causing the ADC elements to take turns sampling and digitizing the receive signal, so that only one of the ADC element outputs is transitioning at any given time.

An array of FFEs (FFE0-FFE3), each forms a weighted sum of the ADC element outputs. The weighted sums employ filter coefficients that are cyclically shifted relative to each other. FFE0 operates on the held signals from ADC3 (the element operating prior to CLK0), ADC0 (the element responding to CLK0), and ADC1 (the element operating subsequent to CLK0), such that during the assertion of CLK2, the weighted sum produced by FFE0 corresponds to the output of FFE 802 (FIG. 8). FFE1 operates on the held signals from ADC0 (the element operating prior to CLK1), ADC1 (the element responding to CLK1), and ADC2 (the element operating subsequent to CLK1), such that during the assertion of CLK3, the weighted sum corresponds to that of FFE 802. And the operation of the remaining FFEs in the array follows the same pattern with the relevant phase shifts. In practice, the number of filter taps may be smaller, or the number of elements in the array may be larger, so as to offer a longer window of valid output.

As with the receiver of FIG. 8, a summer may combine the output of each FFE with a feedback signal to provide an equalized signal to a corresponding decision element. FIG. 9 shows an array of decision elements (Slicer0-Slicer3), each operating on an equalized signal derived from a respective FFE output. As with the decision element of FIG. 8, the illustrated decision elements employ comparators to determine which symbol the equalized signal most likely represents. The decisions are made while the respective FFE outputs are valid (e.g., Slicer0 operates while CLK2 is asserted, Slicer1 operates while CLK3 is asserted, etc.). Preferably the decisions are provided in parallel on an output bus to enable a lower clock rate to be used for subsequent operations.

An array of feedback filters (FBF0-FBF3) operates on the preceding symbol decisions to provide the feedback signals for the summers. As with the FFEs, the inputs for the FBFs are shifted cyclically and provide a valid output only when the inputs correspond to the contents of the FBF 805 (FIG. 8), coinciding with the time window for the corresponding FFE. In practice, the number of feedback filter taps may be smaller than what is shown, or the number of array elements may be larger, so as to offer a longer window of valid output.

As with the decision element of FIG. 8, the decision elements in FIG. 9 may each employ additional comparators to provide timing recovery info, coefficient training info, and/or precomputation to unroll one or more taps of the feedback filter. In the embodiment of FIG. 9, the digital timing circuit is also parallelized, with a timing error estimator 910 accepting symbol decisions and equalized signals in parallel to determine a parallelized version of the timing error signal 310 (FIG. 3). A set of timing loop filters 912 implement the previously discussed feedback circuitry to provide a control signal for the phase interpolator 920 and division-ratio control signal for the PLL. The phase interpolator 920 operates similarly to phase interpolator 320 to convert the PLL clock signal into a set of staggered clock signals having evenly spaced phases with symbol-aligned transitions. A set of delay lines (DL0-DL3) is provided for fine-tuning the individual clock phases relative to each other as needed to, e.g., compensate for different propagation delays of individual ADC elements.

The delay lines may be individually adjusted by a clock skew adjustment circuit 944 based on parameters from a controller 942. The controller 942 may optimize the clock skew adjustment settings based on a reliability indicator from a monitor circuit. In FIG. 9, the monitor circuit is a margin calculator 940 that calculates the minimum difference between the equalized signal and the decision threshold (or equivalently, the maximum error between the equalized signal and the nominal symbol value). Clock skew adjustments are described in greater detail in co-owned U.S. application Ser. No. 16/836,553, "Eye Monitor for Parallelized Digital Equalizers", filed 2020 Mar. 31, now U.S. Pat. No. 10,992,501, which is hereby incorporated herein by reference in its entirety.

Most integrated circuit devices that would employ receivers and clock recovery circuitry have become so complex that it is impractical for electronic device designers to design them from scratch. Instead, electronic device designers rely on predefined modular units of integrated circuit layout designs, arranging and joining them as needed to implement the various functions of the desired device. Each modular unit has a defined interface and behavior that has been verified by its creator. Though each modular unit may take a lot of time and investment to create, its availability for re-use and further development cuts product cycle times dramatically and enables better products. The predefined units can be organized hierarchically, with a given unit incorporating one or more lower-level units and in turn being incorporated within higher-level units. Many organizations have libraries of such predefined modular units for sale or license, including, e.g., embedded processors, memory, interfaces for different bus standards, power converters, frequency multipliers, sensor transducer interfaces, to name just a few. The predefined modular units are also known as cells, blocks, cores, and macros, terms which have different connotations and variations ("intellectual property (IP) core", "soft macro") but are frequently employed interchangeably.

The modular units can be expressed in different ways, e.g., in the form of a hardware description language (HDL) file, or as a fully routed design that could be directly printed to create a series of manufacturing process masks. Fully routed design files are typically process-specific, meaning that additional design effort would usually be needed to migrate the modular unit to a different process or manufacturer. Modular units in HDL form require subsequent synthesis, placement, and routing steps for implementation, but are process-independent, meaning that different manufacturers can apply their preferred automated synthesis, placement, and routing processes to implement the units using a wide range of manufacturing processes. By virtue of their higher-level representation, HDL units may be more amenable to modification and the use of variable design parameters, whereas fully routed units may offer better predictability in terms of areal requirements, reliability, and performance. While there is no fixed rule, digital module designs are more commonly specified in HDL form, while analog and mixed-signal units are more commonly specified as a lower-level, physical description. In any case, such semiconductor IP cores may be kept in a design database which resides on a nontransient information storage medium. Once the device has been fully designed, commercially available software may convert the semiconductor intellectual property cores and other integrated circuit components into semiconductor mask patterns also stored on a nontransient information storage medium. Thereafter, the patterns may be conveyed to the various process units in a suitable assembly line of an integrated circuit manufactory.

Numerous alternative forms, equivalents, and modifications will become apparent to those skilled in the art once the above disclosure is fully appreciated. For example, the foregoing description focuses on the use of integration-based accumulators, but other recursive or moving-average filter implementations providing a low-pass filter response can alternatively be employed. It is intended that the claims be interpreted to embrace all such alternative forms, equivalents, and modifications that are encompassed in the scope of the appended claims.

What is claimed is:

1. An integrated receiver circuit that comprises:
a phase interpolator configured to provide a sampling signal by applying a phase shift to a clock signal in response to a phase control signal;
a sampling element configured to produce a digital receive signal by sampling an analog receive signal in accordance with the sampling signal;
a timing error estimator configured to produce a timing error signal indicating an estimated timing error of the sampling signal relative to the analog receive signal; and
a feedback circuit configured to derive the phase control signal from the timing error signal, the feedback circuit including a scaling element configured to scale the estimated timing error by a scale factor that depends on the phase control signal.

2. The integrated receiver circuit of claim 1, further comprising a demodulator that extracts a digital symbol stream from the digital receive signal.

3. The integrated receiver circuit of claim 1, further comprising a histogram circuit configured to determine a relative probability of each phase control signal value.

4. The integrated receiver circuit of claim 3, further comprising an inversion element configured to determine the scale factor using a reciprocal of said relative probability.

5. The integrated receiver circuit of claim 1, wherein the scale factor is stored in a lookup table that is configured to receive the phase control signal.

6. The integrated receiver circuit of claim 1, wherein the scale factor is derived from contents of a lookup table that is configured to receive the phase control signal.

7. The integrated receiver circuit of claim 1, wherein the scaling element is part of a first feedback path in the feedback circuit configured to minimize a phase component of the estimated timing error, the feedback circuit further including a second feedback path configured to minimize a frequency component of the estimated timing error.

8. The integrated receiver circuit of claim 1, further comprising a fractional-N phase lock loop configured to generate the clock signal, wherein the scaling element is part of a first feedback path in the feedback circuit configured to minimize a phase component of the estimated timing error, the feedback circuit further including an additional feedback path configured to derive a division-ratio error from the estimated timing error.

9. A clock recovery method that comprises, in an integrated receiver circuit:
providing a phase control signal to a phase interpolator to derive a sampling signal from a clock signal;
sampling an analog receive signal in accordance with the sampling signal to obtain a digital receive signal;
producing a timing error signal indicating an estimated timing error of the sampling signal relative to the analog receive signal; and
deriving the phase control signal from the estimated timing error, said deriving including scaling the estimated timing error by a scale factor that depends on the phase control signal.

10. The clock recovery method of claim 9, further comprising demodulating the digital receive signal to extract a digital symbol stream.

11. The clock recovery method of claim 9, further comprising determining a relative probability of each phase control signal value.

12. The clock recovery method of claim 11, further comprising determining the scale factor using a reciprocal of said relative probability.

13. The clock recovery method of claim 9, wherein the phase control signal is used to retrieve the scale factor from a lookup table.

14. The clock recovery method of claim 9, wherein the phase control signal is used to retrieve a relative probability from a lookup table, and wherein the method further includes deriving the scale factor from the relative probability.

15. The clock recovery method of claim 9, wherein said scaling is performed in a first feedback path to minimize a phase component of the estimated timing error, and wherein said deriving the phase control signal employs a second feedback path to minimize a frequency component of the estimated timing error.

16. The clock recovery method of claim 9, wherein said scaling is performed in a first feedback path to minimize a phase component of the estimated timing error, and wherein said method further includes providing a division-ratio error to a fractional-N phase lock loop that provides the clock signal, the division-ratio error being derived from the estimated timing error.

17. A nontransient information storage medium having a semiconductor intellectual property core to generate circuitry comprising:
a phase interpolator configured to provide a sampling signal by applying a phase shift to a clock signal in response to a phase control signal;
a sampling element configured to produce a digital receive signal by sampling an analog receive signal in accordance with the sampling signal;
a timing error estimator configured to produce a timing error signal indicating an estimated timing error of the sampling signal relative to the analog receive signal; and
a feedback circuit configured to derive the phase control signal from the timing error signal, the feedback circuit including a scaling element configured to scale the estimated timing error by a scale factor that depends on the phase control signal.

18. The nontransient information storage medium of claim 17, wherein the circuitry further comprises a histogram circuit configured to determine a relative probability of each phase control signal value.

19. The nontransient information storage medium of claim 18, wherein the circuitry further comprises an inversion element configured to determine the scale factor using a reciprocal of said relative probability.

20. The nontransient information storage medium of claim 17, wherein the circuitry further comprises a lookup table configured to retrieve the scale factor in response to the phase control signal.

\* \* \* \* \*